United States Patent [19]
Popjoy et al.

[11] Patent Number: 6,092,632
[45] Date of Patent: Jul. 25, 2000

[54] GAS SPRING WITH TEMPERATURE COMPENSATION

[75] Inventors: Mark A. Popjoy, Lansdale, Pa.; Robert Kopf, Sudbury, Mass.

[73] Assignee: Fichtel and Sachs Industries, Inc., Gastonia, N.C.

[21] Appl. No.: 08/941,912

[22] Filed: Oct. 1, 1997

[51] Int. Cl.$^7$ ........................................................ F16F 9/52
[52] U.S. Cl. .................. 188/277; 188/322.22; 267/64.11
[58] Field of Search ............................. 267/64.11, 64.12, 267/64.13, 64.15, 64.16, 64.17, 64.18, 64.22, 64.28, 120, 124; 188/276, 277, 322.22; 138/45, 46; 236/93 R, 93 A

[56] References Cited

U.S. PATENT DOCUMENTS

| | | |
|---|---|---|
| 4,369,864 | 1/1983 | De Carbon ............................ 188/277 |
| 4,408,751 | 10/1983 | Dodson et al. ....................... 267/64.25 |
| 4,416,445 | 11/1983 | Coad ........................................ 267/219 |
| 4,944,498 | 7/1990 | Kortgen et al. ....................... 267/64.11 |
| 5,029,824 | 7/1991 | LaBeau et al. ...................... 267/140.13 |
| 5,074,389 | 12/1991 | Slocum ................................... 188/277 |
| 5,106,065 | 4/1992 | Staton et al. .......................... 267/64.11 |
| 5,404,972 | 4/1995 | Popjoy et al. ......................... 267/64.11 |
| 5,628,496 | 5/1997 | Chamberlin .......................... 267/64.11 |

FOREIGN PATENT DOCUMENTS

| | | |
|---|---|---|
| 1 109 456 | 1/1956 | France . |
| 845 125 | 7/1952 | Germany . |
| 855 644 | 1/1953 | Germany . |
| 1 029 635 | 10/1958 | Germany . |
| 29 17 318 A1 | 11/1979 | Germany . |
| 42 18 608 A1 | 12/1993 | Germany . |

*Primary Examiner*—Douglas C. Butler
*Assistant Examiner*—Thomas J. Williams
*Attorney, Agent, or Firm*—Baker Botts L.L.P.

[57] ABSTRACT

A gas spring has a single bypass across the piston that is controlled by a valve member of an elastomeric material, which restricts flow through the bypass when the gas spring is compressed (piston rod moving into the cylinder) and produces a pressure differential across the piston that varies inversely with temperature. The increasing force opposing compression of the gas spring due to the pressure differential across the bypass as the temperature of the gas spring, and thus the output force, decreases maintains the handle load more even over a range of temperatures. The elastomeric valve member has very little effect on the normal operation of the gas spring in the extension (rod moving out) mode.

12 Claims, 2 Drawing Sheets

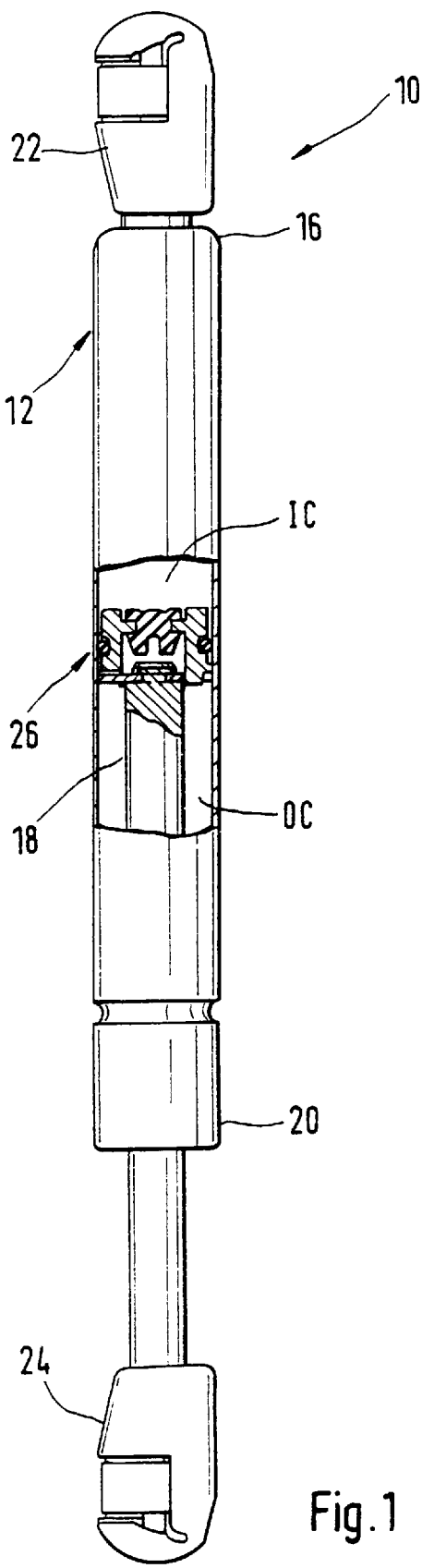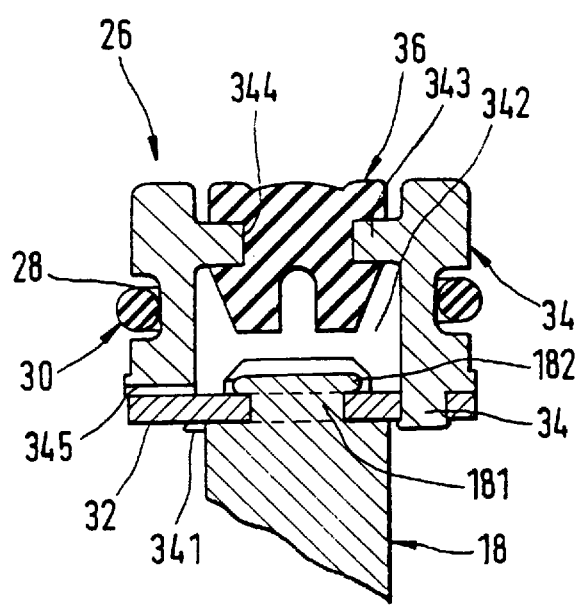
Fig.1
Fig.2

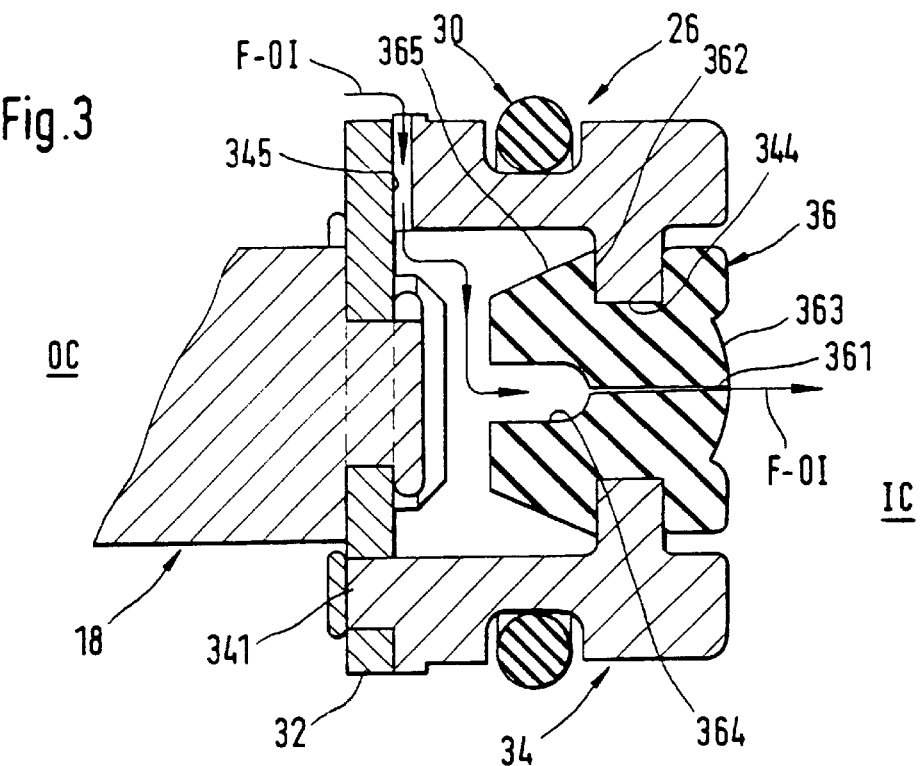
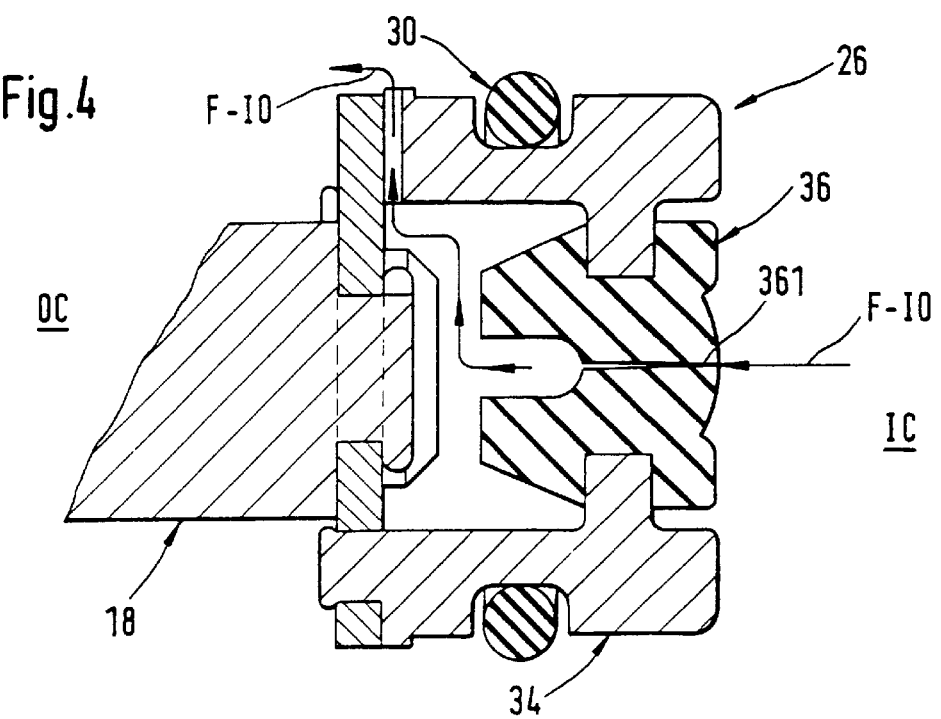

GAS SPRING WITH TEMPERATURE COMPENSATION

BACKGROUND OF THE INVENTION

Gas springs are widely used to counterbalance the engine compartment hoods, trunk lids, rear windows, and tailgates of passenger cars, station wagons, and vans to facilitate opening them and to hold them open at or near a fully open position. It is well known that the force outputs of gas springs vary with the temperature of the gas (Boyle's law); at low temperatures, a gas spring produces a force that is significantly less than the force it produces at high temperatures. It is necessary, therefore, to design the gas spring so that it produces a sufficient force to hold the hood, trunk lid or the like (hereinafter referred to as the "load") open at a suitably selected low temperature, for example, −30° C. (Conventionally, the gas spring is designed to produce a force of about one to five pounds over the load at the hold-open position of the load at, say, −30° C.) At high temperatures, the increase in the force output at the hold-open position may be as much as, say, 50 pounds, which means that the force required to move the load from the hold-open position toward closed ("handle load") is 50 pounds. Large variations in the handle loads are disconcerting to many users.

U.S. Pat. No. 5,106,065 (Staton, Apr. 21, 1992), which is owned by the assignee of the present invention, describes and shows a gas spring that incorporates a bypass having a spring-biased valve that prevents fluid flow past the piston from the closed end to the rod seal end of the chamber until a predetermined force due to a pressure differential is applied across the piston and a bypass having a thermostatic valve, which opens at a predetermined temperature and permits fluid in the chamber to flow past the piston from the closed end to the rod seal end of the chamber. When the thermostatic valve is closed, the spring-biased valve provides a hold-open force that is combined with the force due to the gas pressure to hold the gas spring against a load (handle load). When the thermostatic valve is open, the hold-open force of the gas spring is that due to the gas pressure alone, inasmuch as the fluid flows across the piston through the bypass with the thermostatic valve.

The gas springs disclosed in U.S. Pat. No. 5,106,065 provide a significant improvement over prior art gas springs in that the variation of the handle load due to temperature changes is considerably reduced. On the other hand, they do not eliminate variations in the handle load, inasmuch as they do not prevent changes in the handle load as functions of temperature but merely establish two ranges of handle loads, a low temperature range in which the thermostatic valve is closed and the spring-biased valve contributes a force increment opposing the handle load and a high temperature range in which that force increment is not applied, the fluid flowing past the piston through the bypass with the then open thermostatic valve. In each range, the force on the rod due to gas pressure varies as a function of the gas pressure changes due to temperature changes. At the high end of each of the two ranges, the force of the gas spring resisting the handle load is considerably higher than it is at the low end.

Another patent owned by the assignee of the present invention, U.S. Pat. No. 5,404,972 (Popjoy et al., Apr. 11, 1995) proposes a gas spring in which generally linear temperature compensation for changes in the gas spring force due to temperature variations is achieved by providing a bimetallic temperature-responsive spring operatively associated with a one-way bypass valve that permits fluid flow when the piston is pushed in. The bimetallic spring exerts a force on the bypass valve that varies as a function of the temperature of the gas in the chamber and compensates for variations in the pressure of the gas due to changes in the gas temperature and thereby minimizes variations in the force acting on the piston rod in a direction to resist movement of the piston rod into the cylinder upon application of a handle load. Another bypass with a one-way valve acting to prevent flow past the piston when the rod is pushed in but permitting flow past the piston when the rod moves out permits the spring force to act on the load in the usual manner when the gas spring extends to move or help move the load.

The gas springs of the two patents referred to above provide entirely workable solutions for a vexing problem. The requirements for multiple bypasses, each with a valve, and for maintaining good quality control and close tolerances for several components, especially the springs, involves making numerous parts and performing numerous assembly operations, thus making the gas springs with handle load temperature compensation based on the previously known designs complicated and expensive.

SUMMARY OF THE INVENTION

One object of the present invention is to minimize the variations in handle load due to variations of the gas spring output force as a result of temperature changes of the gas with a piston that has only one bypass, which is controlled by a single valve, thus eliminating many components of previously known gas springs with multiple bypasses and associated valves and significantly reducing costs. Another object is to provide a gas spring in which the piston and the associated elements that form the bypass and a valve controlling flow through the bypass occupy a small volume. Yet another object is to provide a gas spring structure in which performance characteristics can be changed by varying only a single component. It is, in addition, an object of the invention to enhance the consistency of attainment of the desired performance characteristics by the use of only one component, rather than several components, for controlling those characteristics.

The foregoing objects are attained, according to the present invention, by a gas spring that comprises a cylinder member defining a chamber, a closure at one end of the cylinder member, and a piston rod received in sealed relation to the cylinder member at the other end of the cylinder member and movable toward and away from the closure. A piston is affixed to the piston rod within the chamber and carries a piston seal that separates the chamber into an inward compartment adjacent the closed end of the cylinder and an outward compartment adjacent the rod end of the cylinder, the volumes of the compartments varying in accordance with the position of the piston. A mass of a liquid is contained in part of the chamber, and a mass of gas under a pressure higher than atmospheric pressure is contained in the remaining part of the chamber. A single bypass allows the liquid and gas to flow in either direction between the outward compartment and the inward compartment in response to forces imposed on the rod in either direction. Flow through the bypass is controlled by a valve member of an elastomeric material carried by the piston in sealed relation and having an orifice for conducting gas and liquid between the inward compartment and the outward compartment in response to a pressure differential across the valve member. The elasticity and the configuration of the valve member are such that the pressure differential required to cause gas and liquid to flow from the inward compartment into the outward compartment through the orifice varies inversely as a function of the temperature of the valve member.

Elastomeric materials characteristically not only expand and contract as a function of temperature but also have an elasticity that varies considerably with temperature, becoming much more elastic with increasing temperatures. The elastic properties of the material of the valve member, along with its shape, enable the valve member to provide increasing resistance to flow through the orifice as an inverse function of the temperature of the valve member. Thus, as the handle load increases due to the increased spring force of the gas spring at higher temperatures, the differential pressure across the piston required to open the bypass and permit fluid to flow through the orifice in the valve member diminishes, primarily due to the increase in the elasticity of the material from which it is made but also due to thermal expansion of the valve member and a resulting enlargement of the orifice. Conversely, at lower temperatures, the valve member is less elastic and the orifice is smaller, thereby requiring a higher pressure difference across the valve member to force fluid to flow through the orifice. Thus, a single valve member of an elastomeric material with an orifice enables the part of the handle load due to the pressure difference across the piston to be increased with reduced temperatures and decreased with increased temperatures, thereby at least partially offsetting the change in handle load due to the change in the gas spring output force that occurs with temperature variations.

In preferred embodiments of the invention, the piston includes a base portion affixed to the piston rod and a body portion extending from the base portion toward the inward compartment. The body portion receives the piston seal and has a cavity within it. The bypass includes the cavity and at least one hole in the piston communicating the cavity with the outward compartment. The valve member is a circular disc supported along its perimeter in a circular opening in the body portion of the piston, and the orifice is coaxial with the center of the disc. The circular shape of the valve member and the centering of the orifice facilitates manufacture and provides symmetry of expansion/contraction and deformation due to temperature changes and the differential pressure across it. Alternately, the valve member can be designed as an elliptical or otherwise non-circular cross section configuration such that when it is placed into a circular recess it will force a preload in one direction onto the valve.

The portion of the valve member disposed within the opening may have a concave surface facing toward the outward compartment and a convex surface facing toward the inward compartment. That geometry reduces the effect of the valve on the output force and the velocity of rod extension when the gas spring is extending. When the piston rod is being retracted by application of a handle load to it, the valve member geometry tends to produce closing of the orifice, and the mechanism of opening of the orifice to permit flow through the bypass becomes inversion of the "dish" shape by compression of the valve member, as explained below.

The body portion of the piston may have an inwardly extending circumferential flange portion and the valve member a circumferential groove receiving the flange portion of the body. Such a design is readily adapted to common use in a range of gas springs having varying properties but involving only the substitution of valve members with different characteristics.

For a better understanding of the invention, reference may be made to the following description of an exemplary embodiment, taken in conjunction with the accompanying drawings.

DESCRIPTION OF THE DRAWINGS

FIG. 1 is a side elevational view of the embodiment in which a portion of the tube is broken out and a piston and bypass valve assembly are shown in cross section; and FIGS. 2, 3, and 4 are axial cross-sectional fragmentary views of the piston and bypass valve assembly of the embodiment of FIG. 1, showing the stationary mode, rod extension mode and rod retraction mode, respectively.

DESCRIPTION OF THE EMBODIMENTS

Referring to FIG. 1, the gas spring 10 comprises a circular-cylindrical tube (cylinder) 12 that is closed at one end by a rolled and welded cylinder end closure 16. A piston rod 18 extends into the cylinder 12 through a rod seal assembly (not shown) in the rod end 20 of the cylinder. Fittings 22 and 24 are fastened to the cylinder end closure 16 and piston rod 18, respectively, for connecting the gas spring to a device, such as a vehicle body, and a load, such as a hood, trunk lid and the like, that is movable relative to the body. A piston assembly 26 is fastened to the end of the piston rod 18 within the cylinder 12 and includes a seal and a single valve-controlled bypass that divide the chamber within the cylinder into two compartments, the volumes of which vary according to the position of the piston. There is an inward compartment IC between the piston and the cylinder end closure 16 and an outward compartment OC between the piston and the rod seal assembly 20.

The peripheral surface of the piston 26 is in clearance with the inner wall of the cylinder 12. A ring groove 28 receives an elastomeric sealing ring 30 that rides in sealing engagement with the wall of the cylinder 12. Most of the free volume of the cylinder chamber contains air or nitrogen at a pressure of from about 300 to about 4500 psi. The remainder contains a liquid, such as hydraulic brake fluid or mineral oil.

The piston assembly consists of a round disc-like base plate 32, which has a hole that receives a reduced-diameter boss 181 on the end of the piston rod 18. The boss is cold-worked after the plate is installed to provide a plate-retaining head 182. An annular piston body 34 is attached to the base plate 32 by means of staked-over pins 341 integral with the body received in holes in the base plate. The body defines a cavity, into which extends a flange portion 343 having a central circular hole 344. The hole receives a valve member 36 of a soft elastomeric material that has a very small orifice 361 (see FIGS. 3 and 4) at its center. The cavity, orifice and one or more holes 345 in the valve body 34 (which could just as well be in the base plate) form a bypass across the piston through which the gas and liquid in the cylinder chamber can pass in either direction between the inward and outward compartments IC and OC.

Referring to the larger scale view of FIG. 3, the valve member 36 has a groove 362 in its perimeter wall, which accepts the flange portion 343 of the piston body 34 in sealed and retaining relation. The surface 363 facing the inward compartment (to the right in FIGS. 3 and 4) is convex. A central bullet-shaped cavity 364 extending axially into the valve member from the surface facing the outward compartment OC renders that surface roughly concave. A frusto-conical surface 365 diverges from the end closer to the base plate and provides a camming surface that allows the valve member to be forced into place through the hole 344 formed by the flange 343.

The valve member 36 is molded from a soft elastomeric material, an EPDM rubber compounded with oil as a softening agent being suitable. The predominant mechanism controlling the rate of flow through the valve member is its elasticity, which is an inverse function of the temperature of the valve member. The flow through the valve member is also influenced by thermal contraction and expansion and by its configuration.

When the piston rod 18 moves out of the cylinder under the output force of the gas spring and any force applied to the load by a user (to the left in FIG. 3), the gas and liquid ("fluids") in the outward compartment OC of the cylinder chamber flow through the hole 345, the cavity 342 and the orifice 361 ("the bypass") into the inward compartment IC, the flow path being indicated by the arrowed lines F-OI. The general cup or dish shape of the portion of the valve member 36 within a bounding circular cylindrical surface that includes the wall of the hole 344 formed by the flange portion 343 of the piston body 34 promotes a bulging of the valve member toward the inward compartment IC and enlargement of the orifice 361. At relatively low temperatures, the orifice 361 is relatively small due to thermal contraction of the valve member. The valve member is also relatively less elastic than at higher temperatures. Accordingly, the valve member presents a fairly high resistance to fluid flow through the bypass. The primary consequence of that resistance is to slow the rate of rod extension, as compared to the rate at higher temperatures. The cup shape and the elasticity of the valve member under all temperature conditions are such as to permit flow through the bypass by bulging of the valve member, the bulging being increased as a function of the force applied to the piston rod and a corresponding increase in the pressure differential across the valve member. The valve member, in the rod-extension mode of FIG. 3, thus has very little influence over the normal operation of the gas spring other than retarding the speed of extension.

When a handle load is applied to the gas spring by a user such as to compress the gas spring (rod moving into the cylinder, to the right in FIG. 4), a higher fluid pressure is created in the inward compartment IC relative to the pressure in the outward compartment OC. The pressure differential tends to close the orifice, regardless of its size at rest for a given temperature, by tending to flatten the bulging roughly dish-shaped portion within the bounding circular cylindrical surface of the opening 344. At relatively high temperatures, the orifice is relative large, due to thermal expansion of the valve member. The larger size of the orifice and the increased elasticity (greater softness) of the valve member is conducive to inversion of the valve member to an inward bulging condition, thus enlarging the orifice and facilitating flow through the bypass, as indicated by the arrowed lines F-IO in FIG. 4. At high temperatures, therefore, the valve member has little effect on the handle load. At lower temperatures, the orifice is smaller and the valve member is stiffer than at higher temperatures, thus requiring a higher force to produce inversion of the dish-shaped portion. The differential pressure initially closes the orifice by deforming the valve member until the differential pressure is high enough to force inversion, at which point the bypass opens and allows the fluid to flow through the bypass. The force increment required to invert the valve member and open the orifice to flow adds to the gas spring output force. The lower the temperature of the valve member, the higher the force required to open the bypass. Meanwhile, the lower the temperature of the gas spring, the lower the output force and thus the handle load in the retracting mode due to the output force alone. The present invention provides a force due to a pressure differential across the piston that offsets the reduction in the gas spring output force due to lower temperatures so that the handle load is kept more uniform at all temperatures.

We claim:
1. A gas spring comprising
   a cylinder member defining a chamber,
   a closure at one end of the cylinder member,
   a piston rod received in sealed relation to the cylinder member at the other end of the cylinder member and movable toward and away from the closure,
   a piston affixed to the piston rod within the chamber and having a piston seal separating the chamber into an inward compartment adjacent said one end of the cylinder and an outward compartment adjacent said other end of the cylinder, the volumes of the compartments varying in accordance with the position of the piston,
   a mass of a liquid contained in part of the chamber,
   a mass of gas under a pressure higher than atmospheric pressure contained in the remaining part of the chamber, and
   a bypass for allowing the liquid and gas to flow in either direction between the outward compartment and the inward compartment in response to forces imposed on the rod in either direction, said by pass including a valve member of an elastomeric material carried by the piston in sealed relation and having an orifice for conducting gas and liquid between the inward compartment and the outward compartment in response to a pressure differential across the valve member the orifice being closed when the pressure exceeds the threshold, the elasticity and the configuration of the valve member being selected such that the pressure differential required to cause gas and liquid to flow from the inward compartment into the outward compartment through the orifice varies inversely as a function of the temperature of the valve member, the threshold, which is dependant upon the temperature of the value member, being smaller for a higher temperature of the valve member than for a lower temperature of the valve member.

2. A gas spring according to claim I wherein the piston includes a base portion affixed to the piston rod and a body portion extending from the base portion toward the inward compartment, the body portion receives the piston seal and has a cavity within it, the means defining a bypass includes the cavity and at least one hole communicating the cavity with the outward compartment, the valve member is a circular disc supported along its perimeter in a circular opening in the body portion of the piston, and the orifice is coaxial with the center of the disc.

3. A gas spring according to claim 2 wherein the portion of the valve member disposed within the circular opening in the body portion of the piston has a generally concave surface facing toward the outward compartment and a generally convex surface facing toward the inward compartment.

4. A gas spring according to claim 2 wherein the body portion of the piston has an inwardly extending circumferential flange portion, and the valve member has a circumferential groove receiving the flange portion of the body.

5. A gas spring according to claim 4 wherein the flange portion defines the circular opening in the body portion of the piston and the portion of the valve member disposed within the circular opening in the body portion of the piston has a generally concave surface facing toward the outward compartment and a generally convex surface facing toward the inward compartment.

6. A gas spring according to claim 2 wherein the valve member is of non-circular cross section such that when it is placed in the circular opening in the body portion of the piston it will have a force preload in one direction.

7. A gas spring according to claim 2 wherein a central bullet-shaped cavity extends axially into the valve member from the surface facing the outward compartment.

8. A gas spring according to claim 4 wherein a frusto-conical surface diverges from an end of the valve member closer to the base portion toward the flange portion of the body portion of the piston and provides a camming surface that facilitates forcing the valve member into place through the circular opening in the body portion of the piston.

9. A gas spring according to claim 8 wherein a central bullet-shaped cavity extends axially into the valve member from the surface facing the outward compartment.

10. A gas spring according to claim 1 wherein the piston includes a base portion affixed to the piston rod and a body portion extending from the base portion toward the inward compartment, the body portion receives the piston seal and has a cavity within it, the means defining a bypass includes the cavity and at least one hole communicating the cavity with the outward compartment, the valve member is a disc supported along its perimeter in an opening in the body portion of the piston, and the orifice is coaxial with a geometric center of the disc.

11. A gas spring according to claim 10 wherein the portion of the valve member disposed within the opening in the body portion of the piston has a generally concave surface facing toward the outward compartment and a generally convex surface facing toward the inward compartment.

12. A gas spring according to claim 10 wherein the body portion of the piston has an inwardly extending circumferential flange portion, and the valve member has a circumferential groove receiving the flange portion of the body.

* * * * *

UNITED STATES PATENT AND TRADEMARK OFFICE
CERTIFICATE OF CORRECTION

PATENT NO. : 6,092,632
DATED : July 25, 2000
INVENTOR(S) : Popjoy et al.

It is certified that error appears in the above-identified patent and that said Letters Patent is hereby corrected as shown below:

Title page,
[57] ABSTRACT,
Line 9: "decreases maintains" should read -- decreases and maintains --
Line 10: "even" should read -- evenly --

Claims:
Column 6,
Line 26: "by pass" should read -- bypass --
Line 31: "member the" should read -- member, the --
Line 32: "pressure exceeds" should read -- pressure differential remains below a threshold and the orifice being opened when the pressure differential exceeds --

Signed and Sealed this

Twenty-eighth Day of August, 2001

*Attest:*

NICHOLAS P. GODICI
*Attesting Officer*  *Acting Director of the United States Patent and Trademark Office*